Figure 1:
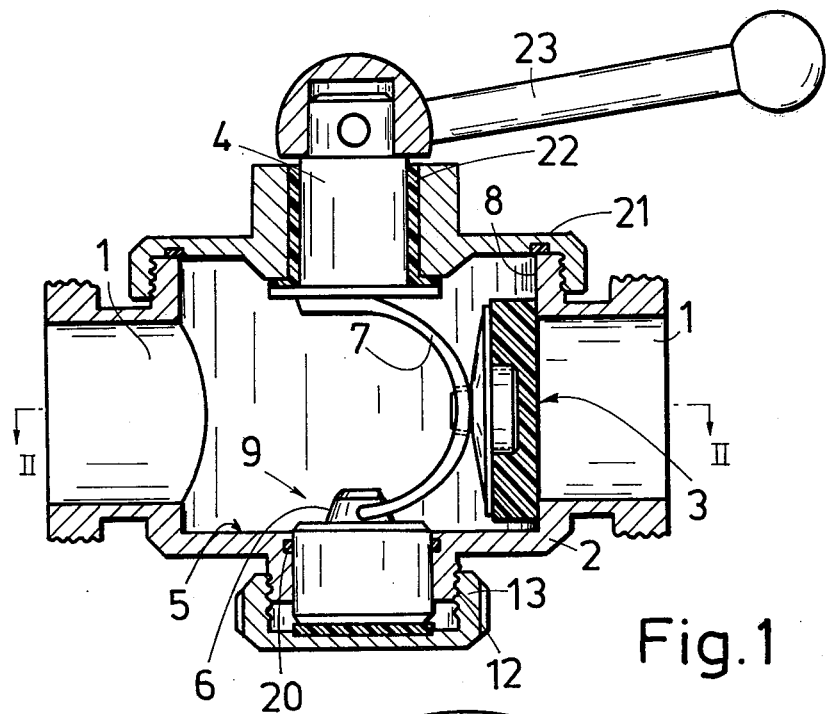

United States Patent [19]

Lehtinen

[11] 4,073,471
[45] Feb. 14, 1978

[54] SHUT OFF VALVE APPARATUS

[76] Inventor: Uuno Johannes Lehtinen, 33940 Pirkkala 4, Finland

[21] Appl. No.: 700,148

[22] Filed: June 28, 1976

[30] Foreign Application Priority Data

Aug. 14, 1975 Finland .................................. 752302

[51] Int. Cl.² .............................................. F16K 25/00
[52] U.S. Cl. ..................................... 251/176; 251/185; 251/298; 137/625.46
[58] Field of Search .............. 251/176, 177, 180, 185, 251/298; 137/625.46, 625.47

[56] References Cited

U.S. PATENT DOCUMENTS

| 563,946 | 7/1896 | Wells | 251/188 |
| 593,412 | 11/1897 | Bromley | 251/188 |
| 658,975 | 10/1900 | Clancy | 251/177 |
| 692,394 | 2/1902 | Whitehill | 251/188 |
| 1,384,540 | 7/1921 | Reeves | 251/177 X |

FOREIGN PATENT DOCUMENTS

| 712,458 | 10/1941 | Germany. | |
| 873,640 | 4/1953 | Germany | 251/188 |
| 85,355 | 4/1955 | Norway | 251/177 |
| 96,037 | 9/1922 | Sweden | 251/177 |

Primary Examiner—Harold W. Weakley
Attorney, Agent, or Firm—Haseltine, Lake & Waters

[57] ABSTRACT

The present invention concerns a shut-off valve comprising a valve body provided with at least two passage ports and a shut-off member of the passage ports with its operating shaft rotatably carried in the valve body, said shut-off member being connected with the operating shaft by means of an arcuate member, which rests against a staying member on the bottom of the valve body and is elastic, in such manner that the shut-off member may be shifted from one passage port to another by turning the operating shaft, whereby the shut-off member is pressed against the inner surface of the valve body, radially urged by the arcuate member. The valve comprises an adjustable tensioning means, against which the arcuate member is braced and by adjustment of which the pressure of the shut-off member against the inner surface of the valve body is adjustable with change of the curvature of the arcuate member.

10 Claims, 7 Drawing Figures

SHUT OFF VALVE APPARATUS

SUMMARY OF THE INVENTION

Such valves are known in prior art which have a straight operating shaft placed in the centre of the valve body. The urging of the closing member against the inner surface of the valve body is by the aid of a wedge urging arrangement, which is either completely inelastic or has been fitted with cup springs. Furthermore a shut-off valve is known wherein the operating shaft comprises an elastic arcuate member, which is braced against a staying member mounted in the bottom of the valve body end under the elastic urging of which the shut-off member is pressed against the inner surface of the valve body. The above-mentioned valves with straight operating shaft have the drawback that the straight operating shaft impedes the liquid flow through the body, thereby causing pressure losses. It is further a fact that valves of this type are not appropriate for the handling of foodstuffs, owing to the great difficulty of their cleaning and maintenance. In the said German design the pressure losses of the liquid flow passing through the valve body could be reduced by means of a curved shape of the arcuate member, passing around the main flow area, which is favourable in view of flow resistance. As a result of its design, however, the valve is only appropriate for use within a certain pressure range, and the questions of how this valve is controlled are unsolved in particular. It is further observed that serious sealing problems are introduced by the shut-off member as it wears down or by the arcuate member as it slackens.

The object of the present invention is to eliminate the drawbacks mentioned. The invention is characterized in that the valve comprises an adjustable tensioning means, whereagainst the arcuate member is braced and by the adjustment of which the tension with which the shut-off member is urged against the inner surface of the valve body is adjustable, changing the curvature of the arcuate member.

Thanks to the invention, the tension urging the shut-off member against the inner surface of the valve body may be adjusted to conform to the pressure conditions or to the desired sealing, using the tensioning means. When this is done, the curvature of the arcuate member, which is braced against the tensioning means and is elastic, changes, and at the same time the spring force urging the shut-off member against the inner surface of the valve body changes, the pressure of said shut-off member against the inner surface of the valve body changing simultaneously in accordance with the adjustment of the tensioning means.

The valve of the invention is both easy and light to operate, and the shut-off member is conveniently shiftable from one passage port to another by turning the operating shaft e.g. with the aid of a turning handle, the arcuate member yielding elastically in the turning operation. The radial force urging the arcuate member against the inner surface of the valve body may be adjusted with the aid of the adjustable tensioning means as required, e.g. observing the wear of the shut-off member or of the inner surface of the valve body. The curved shape of the arcuate member enables the passage of a completely unimpeded liquid flow, since the passage ports of the valve are free, owing to the shape of the arcuate member, which is curved and passes around the space connecting the passage ports. The design of the valve is moreover quite simple, and the valve is easy to maintain and to clean because the number of parts subject to wear is small.

The arcuate member which is a part of the valve of the invention joins the shut-off member unturnably with the operating shaft so that the arcuate member together with its shut-off member turns along with the operating shaft when this shaft is turned. The arcuate member is axially and radially braced against the operating shaft, and concentrically against the staying member on the bottom of the valve body, urging the shut-off member radially against the inner surface of the valve body.

The arcuate member consists preferably of a substantially semicircular spring braced by its ends against the operating shaft and the bottom of the valve body; naturally, a circular, or angulated or articular arcuate member may also be employed.

In an advantageous embodiment of the invention, the tensioning means comprises a screw displaceable with reference to the operating shaft and affixed with threads to the bottom of the valve body, against which screw the arcuate member is braced by mediation of a staying member.

In another advantageous embodiment of the invention, the tensioning means comprises a cover displaceable with reference to the operating shaft and attached by threads to the bottom of the valve body, against which cover the arcuate member is braced by mediation of a staying member.

In a third advantageous embodiment of the invention, the tensioning means consists of a staying member attached to the bottom of the valve body by threads and displaceable with reference to the operating shaft with the aid of said threads.

In a fourth advantageous embodiment of the invention, the staying member consists of a conically shaped axle pin concentric with the operating shaft and placed on the bottom of the valve body. Furthermore, the arcuate member is advantageously shaped to have a recess which is urged against the staying member. Then, as the staying member is displaced in its axial direction, the radius of curvature of the arcuate member increases or decreases, as the case may be, owing to the conical shape of the staying member, the recess of the arcuate member being displaced on the axis of the staying member, away from or towards the turning axis, as the case may be.

In a fifth advantageous embodiment of the invention, the tensioning means comprises a screw displaceable with reference to the operating shaft and affixed with threads to the operating shaft. The arcuate member has then been suitably attached to the operating shaft in such manner that the end of the arcuate member which is attached to the operating shaft is displaceable with reference to the operating shaft by turning said screw.

In still another advantageous embodiment of the invention, the tensioning means comprises a flange attached by threads to the valve body and against which flange the arcuate member is braced by mediation of the operating shaft, and the operating shaft is displaceable axially with reference to the valve body by the aid of said flange.

Figure 2:
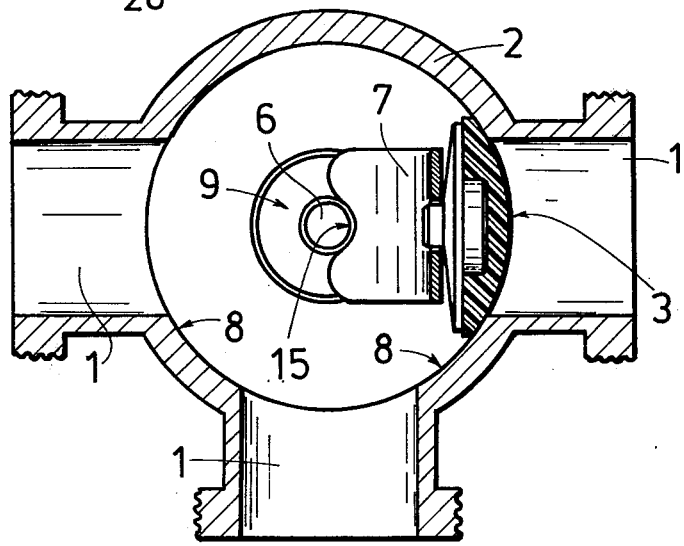
Figure 3:
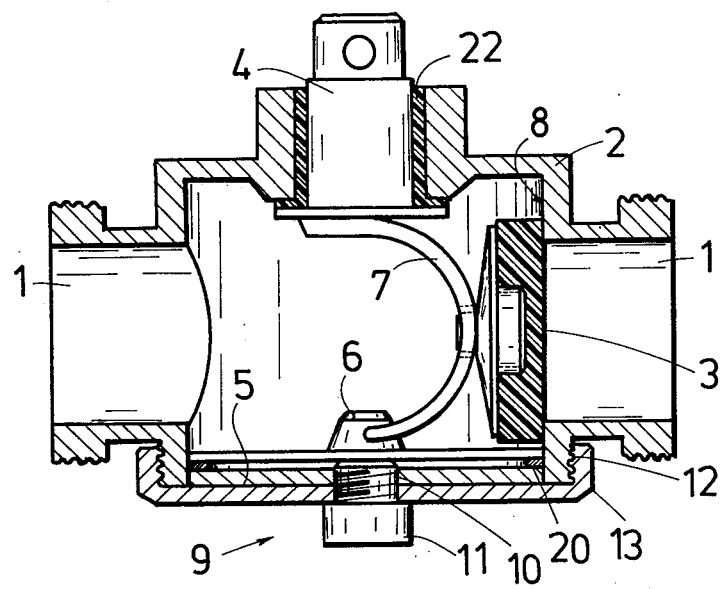
Figure 4:
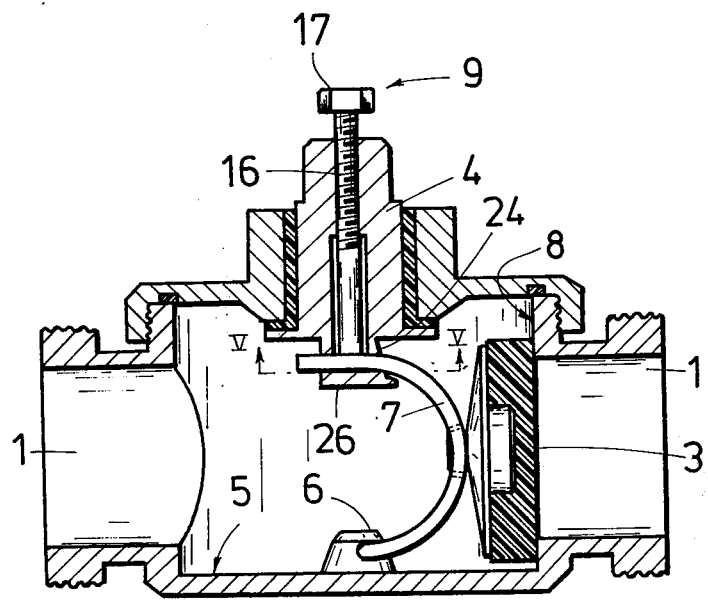
Figure 6:
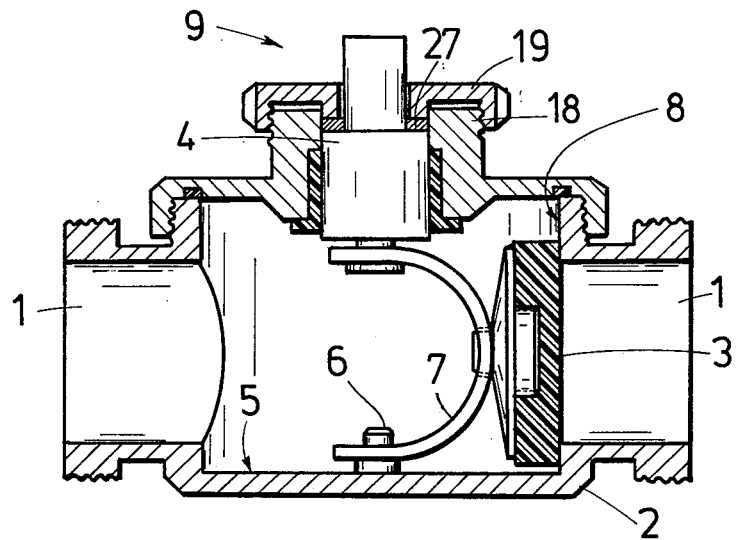
Figure 5:
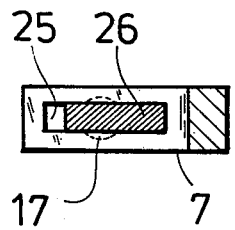

The invention is described in the following in detail with the aid of embodiment examples, referring to the attached drawings, wherein:

FIG. 1 presents a valve according to the invention, sectioned,

FIG. 2 shows the section along the line II—II in FIG. 1,

FIG. 3 presents another valve according to the invention, sectioned,

FIG. 4 presents a third valve according to the invention, sectioned,

FIG. 5 shows the section along the line V—V in FIG. 4,

FIG. 6 presents a fourth valve according to the invention, sectioned, and

Figure 7:
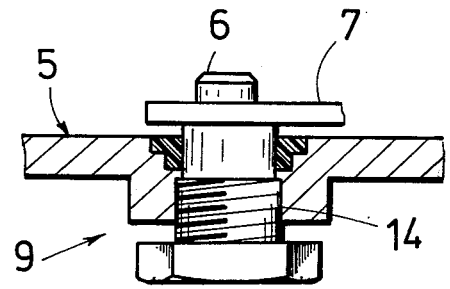

FIG. 7 presents the tensioning means comprised in a valve according to the invention.

The valves according to the invention presented in the embodiment examples comprise at least two passage ports 1, a valve body 2, a shut-off member 3 and an operating shaft 4. The said shut-off member 3 has been connected with the operating shaft by the aid of a semicircular shaped arcuate member 7 constituting a spring, this arcuate member being braced by one end against the operating shaft and by its other end against a staying member 6 concentric with the operating shaft and mounted on the bottom 5 of the valve body. The inner surface 8 of the valve body 2 forms a cylindrical surface, so that the shut-off member 3 is shiftable from one passage port 1 to another by turning the operating shaft 4, whereby the shut-off member is pressed against the said inner surface of the valve body, radially urged by the elastic arcuate member. According to the invention, the valve comprises an adjustable tensioning means 9, against which the arcuate member 7 is braced and by adjustment of which the spring force pressing the shut-off member 3 of the arcuate member against the inner surface 8 of the valve body can be adjusted.

In the design shown in FIG. 1, the tensioning means 9 consists of a staying member 6 mounted on the bottom 5 of the valve body 2 and which is displaceable with reference to the operating shaft 4 by the aid of a cover 13 attached to the valve body with threads 12, and against which the staying member 6 is braced. The staying member 6 has the shape of a truncated circle-based cone and mates with the recess 15 provided on the end of the arcuate member 7. The staying member 6 is sealed against the bottom 5 of the valve body 2 by the packing 20, and the operating shaft 4 is sealed against the cover 21 of the valve body by the packing 22. The valve furthermore comprises a handle 23 attached with a bolt joint.

When the cover 13 is screwed in, the lower end of the arcuate member 7 rises upwardly, lifted by the staying member 6, whereby the point of the arcuate member affixed to the shut-off member 3 is forced radially and elastically outward, with a change of curvature of the arcuate member, and it urges the shut-off member against the inner surface 8 of the valve body 2. Owing to the conical shape of the staying member 6, the lower end of the arcuate member 7 at the same time tends to move outwardly, whereby the shut-off member 3 is even further urged against the inner surface 8.

In the embodiment presented in FIG. 3, the staying member 6 has been shaped to resemble a flange, and it is braced against a screw 11 attached by threads 10 to the bottom 5 of the valve body 2, the turning of said screw enabling the pressure of the shut-off member 3 against the inner surface 8 of the valve body to be adjusted as desired. The flange-like staying member 6 is sealed by the packing 2c against the valve body 2.

In the embodiment shown in FIG. 4, the tensioning means 9 consists of a screw 17 attached by threads 16 to the operating shaft 4, and against the lower end of which screw the upper end of the arcuate member 7 is braced. When the screw 17 is turned, the upper end of the arcuate member 7 moves downward and at the same time, forced by the surface 24 sloping towards the shut-off member 3, it moves towards said shut-off member 3, urging this member against the inner surface 8 of the valve body 2. In FIG. 5 an elongated aperture 25 provided in the upper end of the arcuate member 7 can be seen, through which the fixing member 26 for the lower end of the operating shaft has been pushed.

In the design presented in FIG. 6, the tensioning means 9 consists of a flange 19 affixed by threads 18 to the valve body 2, and against which the upper end of the arcuate member 7 is braced by means of the operating shaft 4. Between the operating shaft 4 and the flange 19 an unturnable washer 27 has been inserted, which prevents the rotation of the flange along with the operating shaft 4.

In FIG. 7 a design solution has been shown wherein the tensioning means 9 consists of a staying member 6 attached by threads 14 to the bottom 5 of the valve body 2, and against which staying member the lower end of the arcuate member 7 is braced.

The invention is naturally not confined to the embodiment examples presented, and its applications may vary within the scope of the claims following below.

What I claim is:

1. Shut-off valve employing a valve body provided with at least two passage ports; a shut-off member cooperating with said passage ports; an operating shaft rotatably disposed in said valve body; said shut-off member being connected to an arcuate spring member braced against a staying member on the bottom of said valve body and connected to the operating shaft at the top whereby said shut-off member being shiftable from one passage port to another by turning said operating shaft; said shut-off member being urged against said valve body inner surface in a radial direction by said arcuate member; said valve being further defined by an adjustable tensioning means concentric with said operating shaft, against which said arcuate member is braced, and by adjustment of which the pressure of said shut-off member against the inner surface of said valve body is adjustable with change of the curvature of said arcuate member.

2. Shut-off valve as recited in claim 1, wherein the tensioning means comprises a staying member and the staying member is displaceable with reference to the operating shaft in the axial direction of this shaft and securable in desired position with reference to the operating shaft.

3. Shut-off valve as recited in claim 1, wherein the tensioning means comprises a screw displaceable with reference to the operating shaft and attached by threads to the bottom of the valve body, against which screw the arcuate member is braced by mediation of the staying member.

4. Shut-off valve as recited in claim 1, wherein the tensioning means comprises a cover displaceable with reference to the operating shaft and attached by threads to the bottom of the valve body, against which cover the arcuate member is braced by mediation of the staying member.

5. Shut-off valve as recited in claim 1, wherein the tensioning means comprises a staying member attached to the bottom of the valve body by threads and which is displaceable with reference to the operating shaft by the aid of said threads.

6. Shut-off valve as recited in claim 1, wherein the staying member comprises a conical axle pin concentric with the operating shaft and mounted on the bottom of the valve body.

7. Shut-off valve as recited in claim 6, comprising a recess formed on the arcuate member pressing itself against the staying member.

8. Shut-off valve as recited in claim 1, wherein the tensioning means comprises a screw displaceable with reference to the operating shaft and attached by threads to the operating shaft.

9. Shut-off valve as recited in claim 1, wherein the tensioning means comprises a flange attached to the valve body by threads and against which the arcuate member is braced by mediation of the operating shaft, and that the operating shaft is axially displaceable with reference to the valve body by the aid of said flange.

10. Shut-off valve as recited in claim 1, comprising a pointer provided in the tensioning means indicating the tension of the shut-off member.

* * * * *